Figure 1:
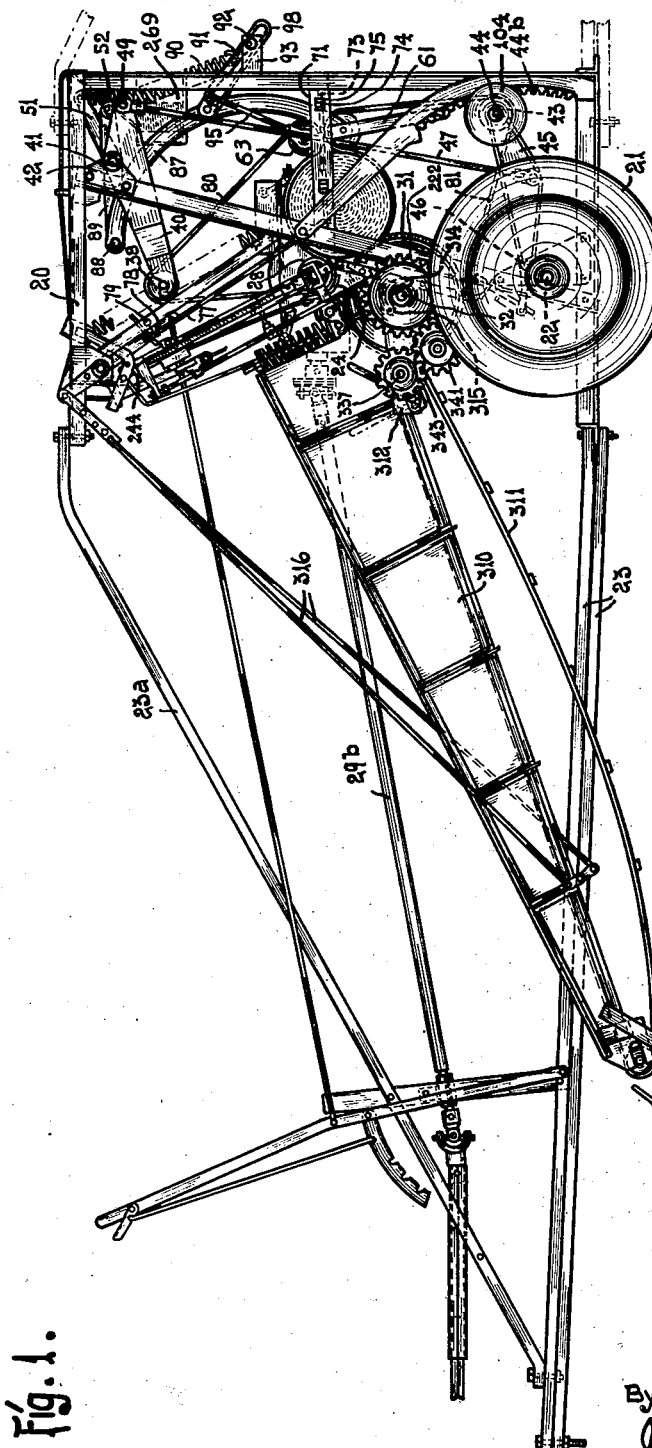

Dec. 14, 1943. U. F. LUEBBEN 2,336,491
ROTARY BALER
Filed Dec. 12, 1938 8 Sheets-Sheet 1

Inventor
By U. F. Luebben.
John C. Baisch
Attorney

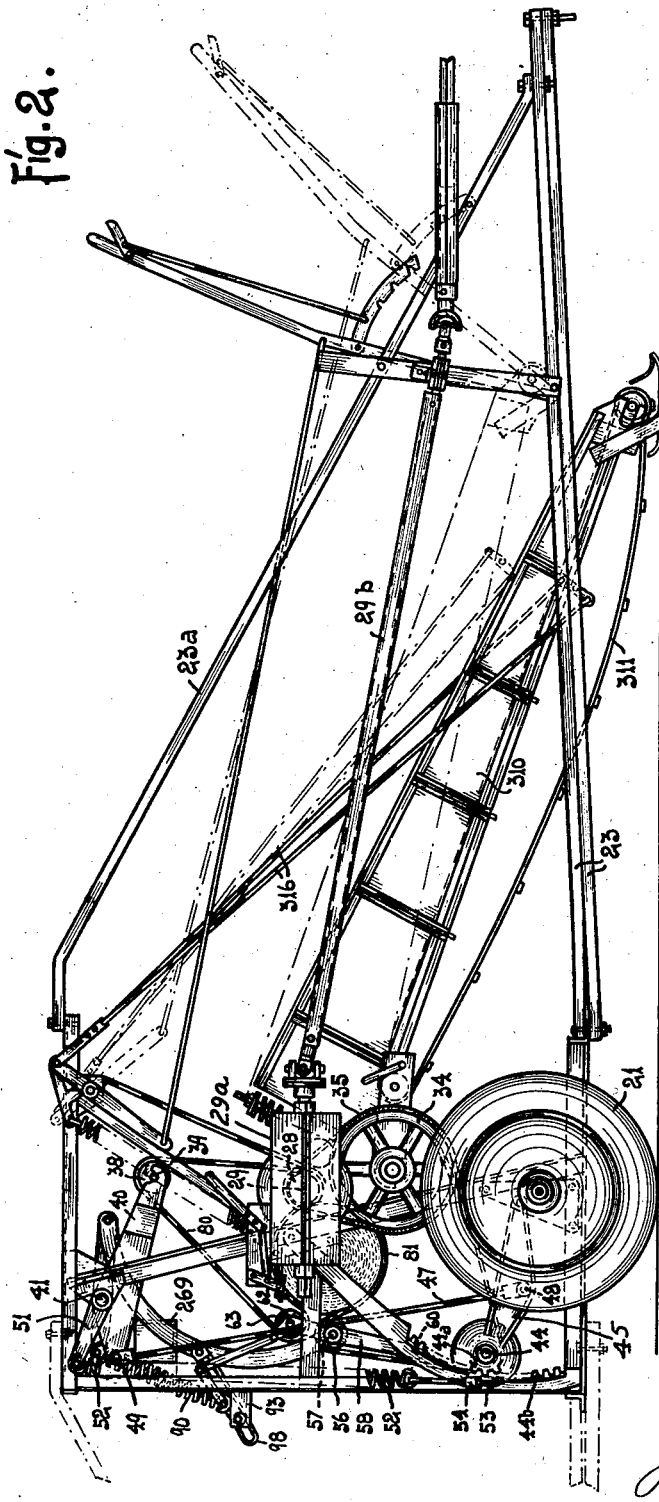

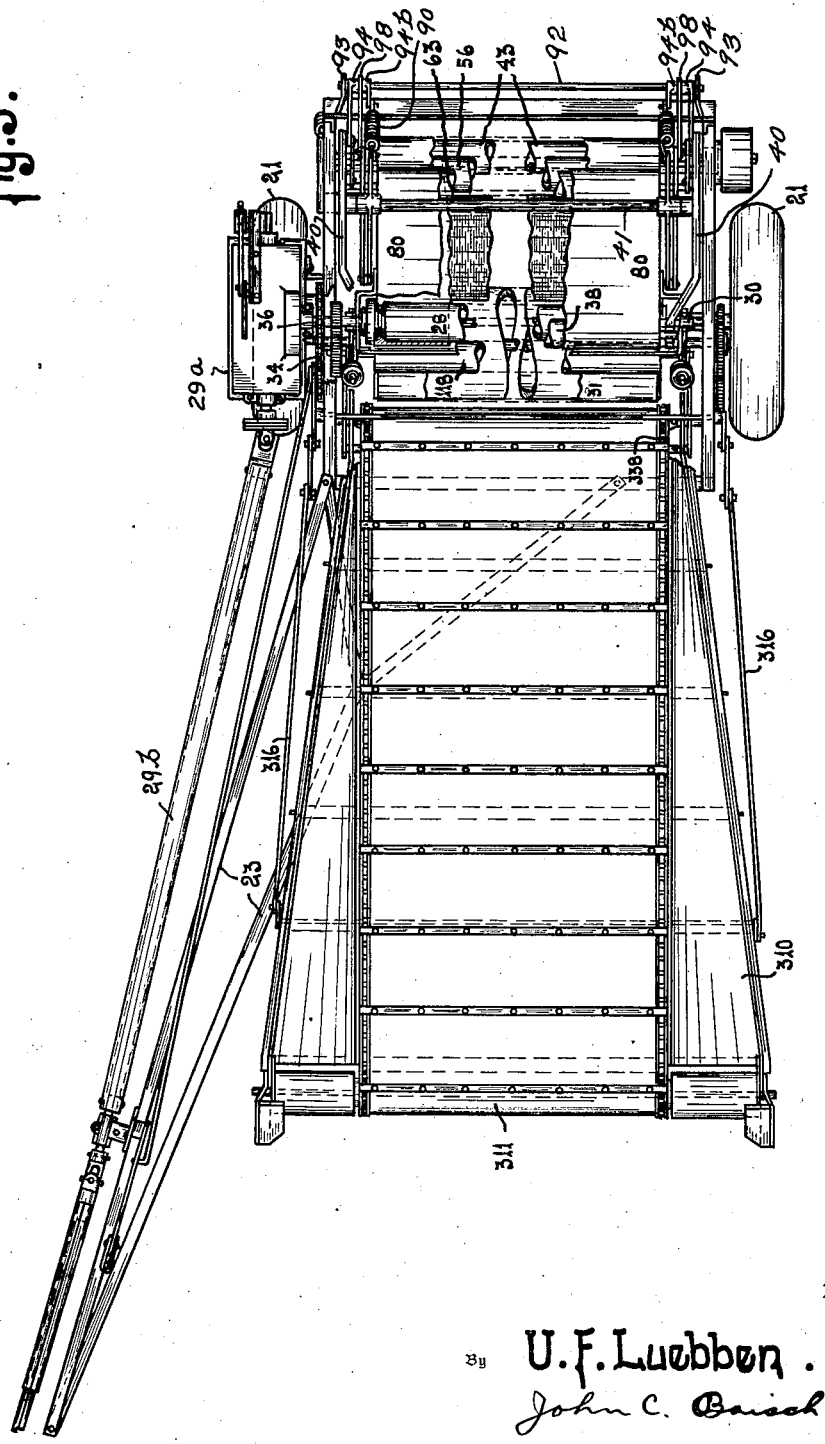

Dec. 14, 1943.  U. F. LUEBBEN  2,336,491
ROTARY BALER
Filed Dec. 12, 1938   8 Sheets-Sheet 4

Inventor
U. F. Luebben.
By John C. Baisch
Attorney

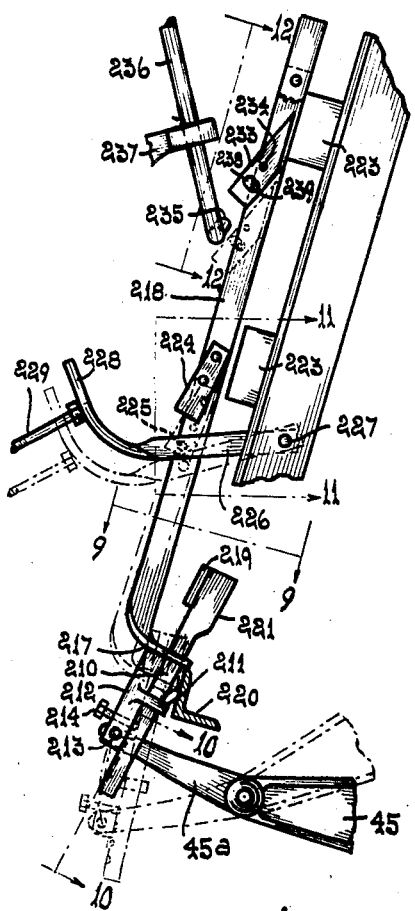
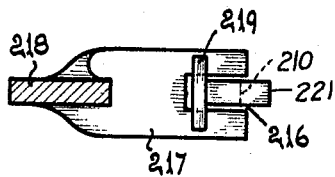
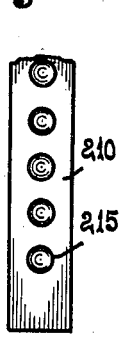
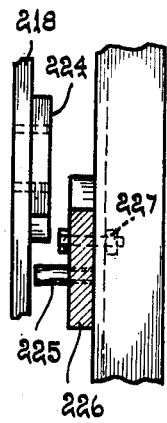
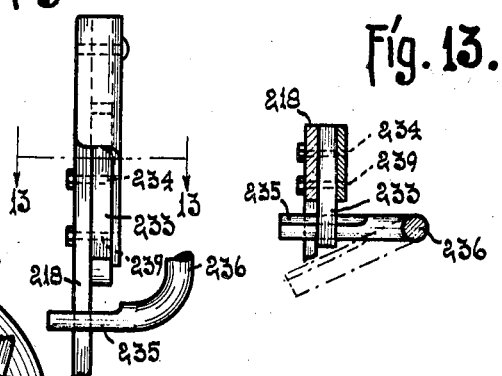
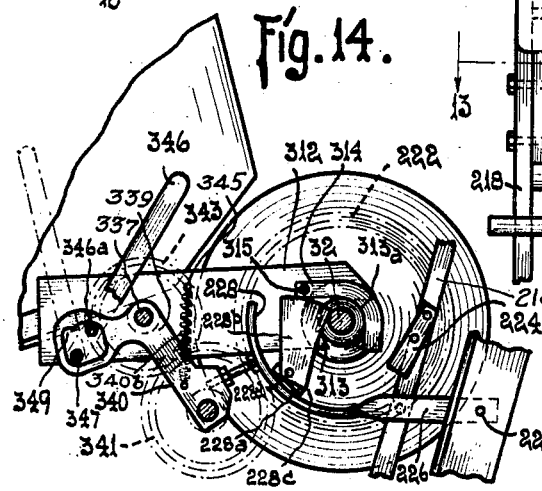

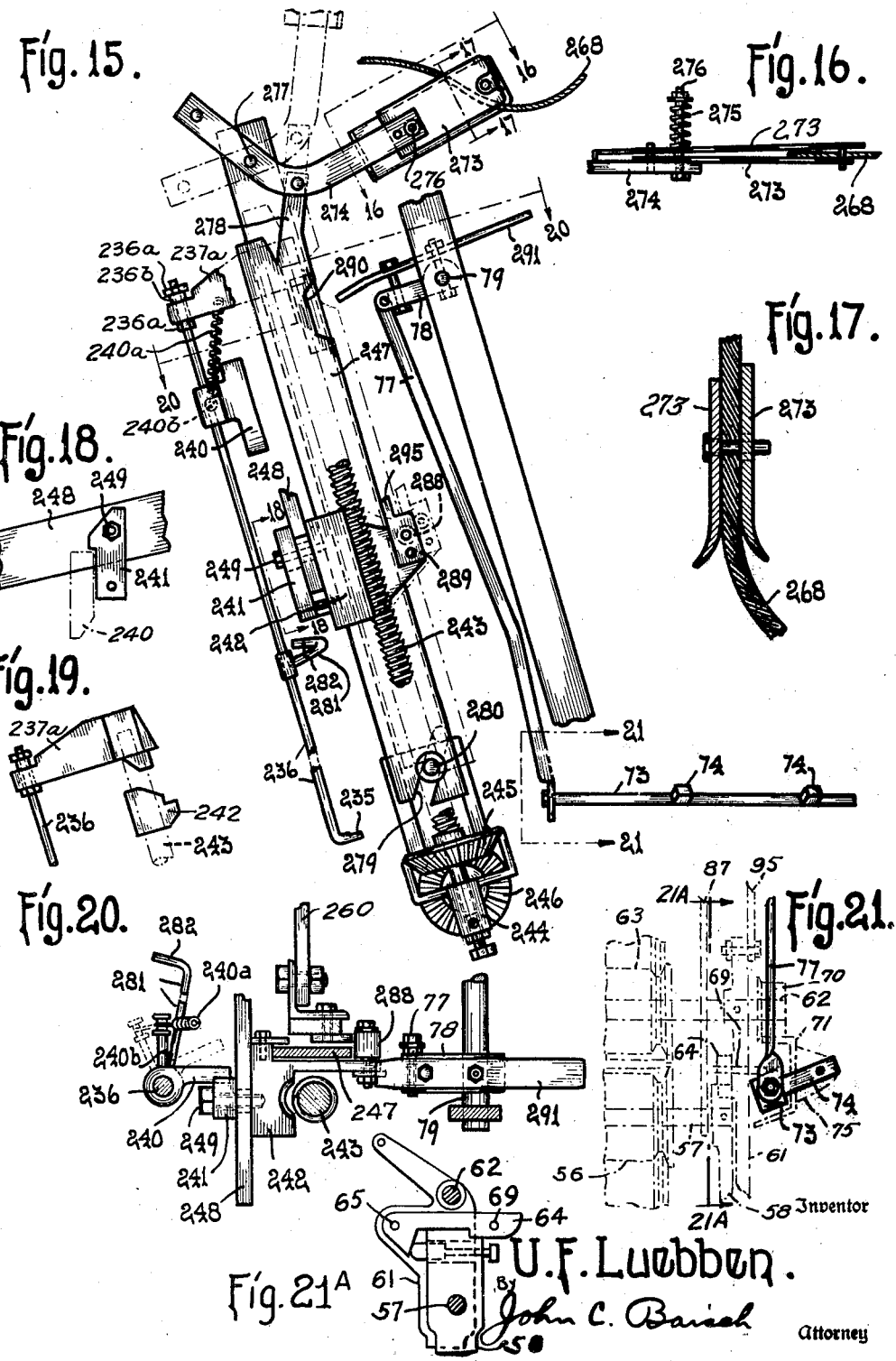

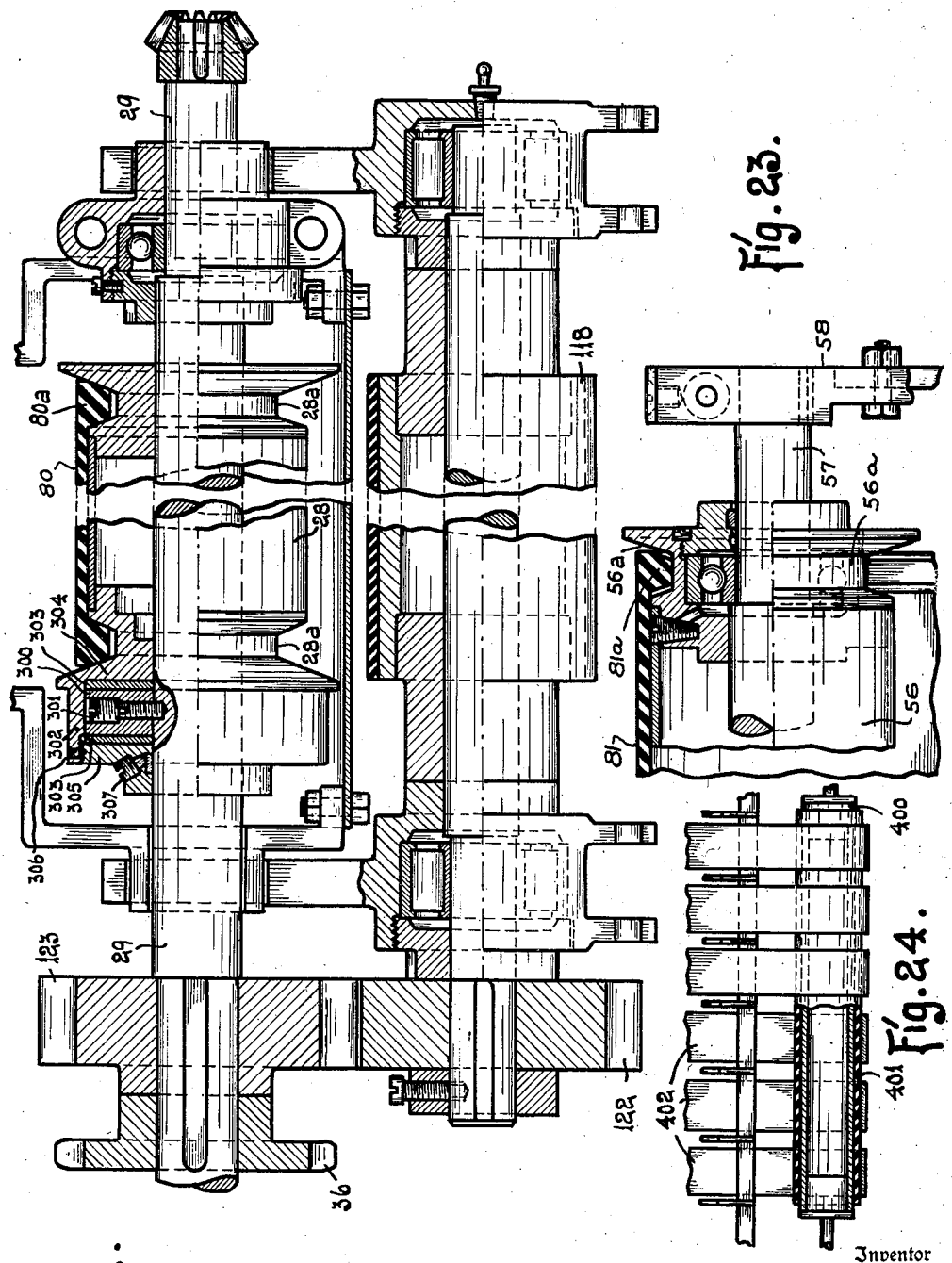

Dec. 14, 1943.   U. F. LUEBBEN   2,336,491
ROTARY BALER
Filed Dec. 12, 1938   8 Sheets-Sheet 8

Inventor:
U. F. LUEBBEN
By Frank J. Schraeder Jr.
Attorney.

Patented Dec. 14, 1943

2,336,491

UNITED STATES PATENT OFFICE 2,336,491

ROTARY BALER

Ummo F. Luebben, Omaha, Nebr.

Application December 12, 1938, Serial No. 246,042

21 Claims. (Cl. 100—1)

This invention relates to improvements in the art of baling compressible substances such as hay, cotton, straw, cornstalks and the like, and particularly to improvements in my baling machine disclosed in my Patent No. 2,096,990.

It is an important object of my invention to provide a portable or traveling means for baling such materials in a more efficient, automatic and economical manner than heretofore.

Another object of the invention is to provide an automatic machine of this character that is relatively light in weight and of comparatively few and simple parts adapted to form compact cylindrical bales of hay or other fibrous material with particular reference to means for a more efficient action in starting the rolling of a bale and an efficient and adjustable automatic means for making bales of various densities and sizes.

Another object is to provide means to assure a more positive movement of the belts particularly at the initial stage of the roll at which time said belts lack sufficient tension otherwise for required movement.

A further object of the invention is to provide a machine of this character having single wide belts and means for guiding same on the respective rollers thereof and to assure needed driving force for the belts.

Another object of the invention is to provide a machine of this character wherein one of the bale forming members is frictionally driven whereby slippage may occur to compensate for the increasing circumference of the bale as same is formed so as to avoid undue wear of the flexible members and power requirements and means for adjustment of said friction for required driving force.

Another object of the invention is to provide automatic means for wrapping the bale spirally from one end to the other with twine or the like when the bale has reached a desired or predetermined size and the cutting of the oncoming twine when the bale has been wrapped.

Another object of the invention is to provide means for adjustably controlling the amount of twine wrapped about the bale.

Another object of the invention is to provide a machine of this character having automatic as well as manual means for releasing and discharging the bale from the machine after said bale has been formed and wrapped with twine.

Another object is to provide means for automatically picking up material to be baled from the ground and feeding same to the baling mechanism as the machine is moved along.

A further object of the invention is to provide a machine of this character having twine feeding mechanism including a screw and half-nut or other threaded member that engages less than 180° of the screw and driven by said screw and means for automatically engaging and disengaging said nut from operative association with the screw and locking same in a disengaged position.

Another object is to provide automatic, as well as hand operated means, for stopping the operation of the conveyor web of the hay feeding means.

Still another object is to provide a machine of this character having positive means for driving and guiding the bale forming belts on their respective rollers.

Numerous other objects and advantages of the invention will be apparent as it is better understood from the following detailed description, which, taken in connection with the accompanying drawings, discloses a preferred embodiment thereof.

Figure 25:
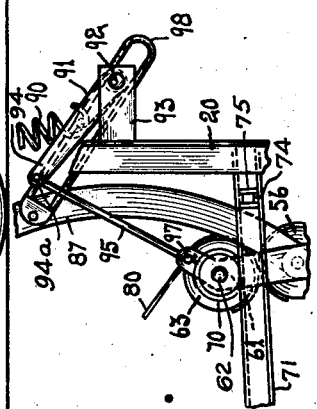
Figure 4:
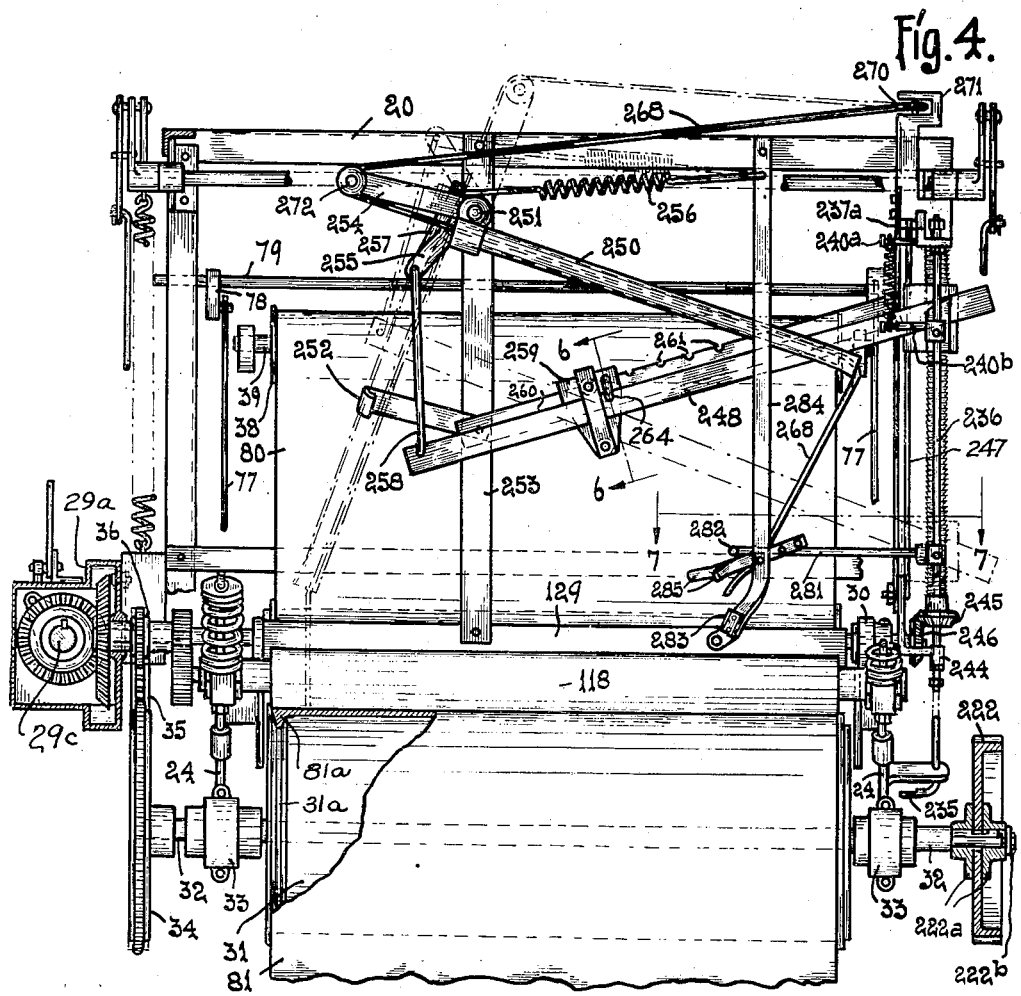
Figure 5:
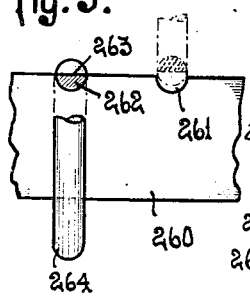
Figures 6, 7:
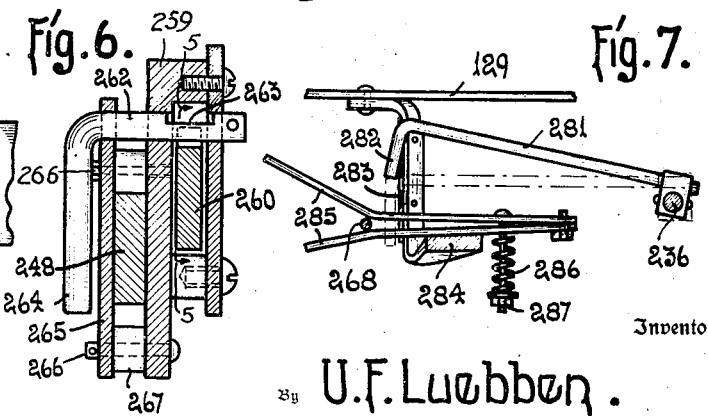
Figure 26:
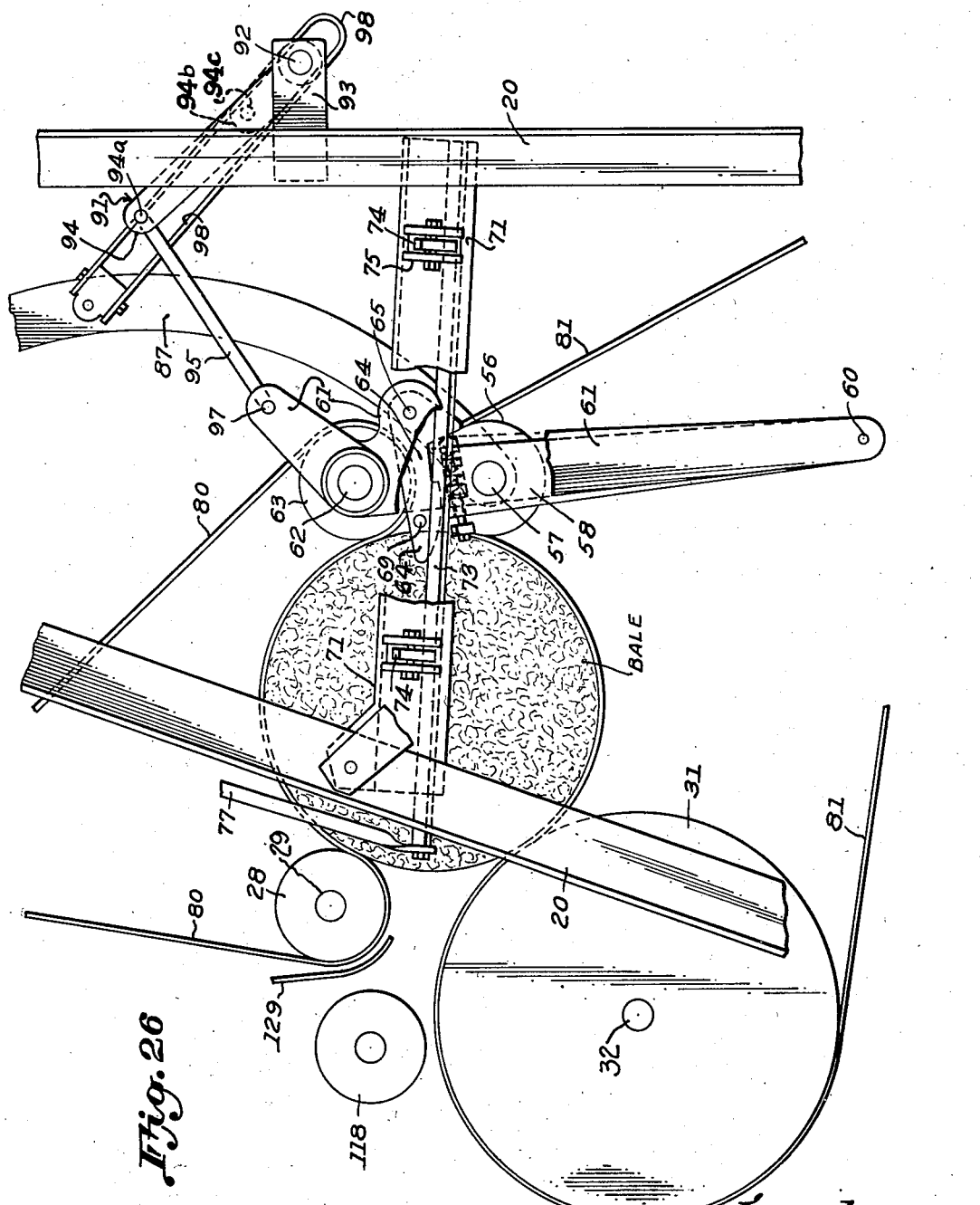

Referring to the drawings:

Figure 1 is a side elevation of a baling machine embodying my invention; Figure 2 is an elevation of the opposite side of the machine; Figure 3 is a plan view of the machine with certain parts broken away to show the relative position of the rollers; Figure 4 is a front elevation of the baling and wrapping mechanism; Figure 5 is an enlarged partial section of the locking key taken on line 5—5 of Figure 6; Figure 6 is an enlarged cross-section of the fulcrum block taken on line 6—6 of Figure 4; Figure 7 is an enlarged partial section taken on line 7—7 of Figure 4 showing the twine cutting knife and related mechanism; Figure 8 is an enlarged side elevation of the automatic trip mechanism for initiating the wrapping of the bale and the automatic disengaging of the conveyor web from operative association with the source of power; Figure 9 is an enlarged partial section taken on line 9—9 of Figure 8 showing the head of the adjustable link in operative association with the tripping lever; Figure 10 is an enlarged partial section of the recessed face of the adjustable link taken on line 10—10 of Figure 8; Figure 11 is an enlarged partial section of the conveyor web disengaging trip of the trip bar taken on line 11—11 of Figure 8; Figure 12 is an enlarged view or section of the pivoted trip of the wrapping mechanism taken on line 12—12 of Figure 8; Figure 13 is a section taken on line 13—13 of Figure 12; Figure 14 is an enlarged partial side elevation of the mechanism for disengaging the conveyor web from operative association with its source of power; Figure 15 is an enlarged side elevation of the mechanism for operating the twine wrapping mechanism and for automatically tripping the bale for discharging of same from the baling mechanism; Figure 16 is a section taken on line 16—16 of Figure 15 showing the twine tension mechanism; Figure 17 is an enlarged section taken on line 17—17 of Figure 15; Figure 18 is a partial view showing means whereby the half nut is engageable with the seat piece to retain said half nut at its upper limit of movement; Figure 19 is a partial view of the bracket in which the upper end of the screw is journaled; Figure 20 is an enlarged section taken on line 20—20 of Figure 15; Figure 21 is a section taken on line 21—21 of Figure 15; Figure 21A is a cross-section taken on line 21A—21A of Figure 21; Figure 22 is an enlarged partial section of the lagged feed roll and upper drive roller showing the frictional driving mechanism of said drive roller and a section of a baling belt with enlarged V-shaped edges that run in corresponding grooves in the roller to give to the belt a positive drive and to hold the belt in its proper position on the rolls, thus eliminating the necessity of a plurality of belts and guides between said belts; Figure 23 is an enlarged section of one of the idler rollers showing the widened and shallower V-shaped grooves thereof whereby the belt is positively guided with respect to said rollers but without undue friction; Figure 24 is a view of a modified embodiment of the driving rollers with portions broken away to show the lagging of the rollers to provide greater driving force when plain flat belts are used instead of the single wide belts of the preferred embodiment of the invention; Figure 25 is an enlarged detail view of the connector arms; and Figure 26 is an enlarged detail of a portion of the bale-discharge mechanism.

This invention primarily includes means for more positive movement of the baling belts, frictionally driven drive rollers, simplified construction and improved action in the discharge of the bales, means for hand or automatic stopping of the feeding of the material to the machine, wrapping twine spirally about the bale and discharging said bale from the machine. It also includes operative means through a power shaft and universal joints adaptable to be coupled to and driven by a modern farm tractor or other means and operable when moving or when standing still as will be particularly described and claimed herein. The invention also contemplates means for gathering hay or the like from the ground, said means comprising a separate invention only briefly described herein and to be fully described and claimed in a separate application.

Referring more particularly to the drawings the machine includes oppositely disposed frame members 20, suitably arranged in vertical, horizontal and inclined positions, as shown, and connected together by means of an adequate number of transversely disposed members, the arrangement of parts being such that the mechanism of the invention is adequately supported.

The whole machine is preferably mounted on two wheels 21 on an axle 22 suitably secured to the frame and is normally supported in a vertical position by means of a reach 23 adapted to be reversibly bolted either to the front or rear of the machine at the bottom and top of the frame 20 and supported at its other end by any suitable means such as a tractor, the engine of which may be employed to furnish motive power for drawing the machine and for operating the baling, wrapping, and pickup and feed mechanisms.

Oppositely disposed brackets 24 are bolted or otherwise secured to the inclined uprights of frame 20. An upper-driver-roller 28 for the upper belt 80 is frictionally connected with a drivershaft 29, said shaft running in journaled boxes 30 or other anti-friction bearings such as ball bearings or roller bearings, which are secured to the upper part of bracket 24 on one side and on the other side in a gear box 29a. The drivershaft 29 at the gear box end extends into said gear box 29a which houses suitable gears for connecting said shaft 29 with a drive shaft 29b adapted to be operably connected with the tractor or other source of power for operating the mechanism, this connection being established through a bevel gear on the shaft 29 meshing with a bevel gear on a longitudinal shaft 29c mounted in the housing 29a and projecting therefrom at the forward and rear ends, the forward end being flexibly connected to the drive shaft 29b.

The friction connection hereinabove referred to and shown in Figure 22, comprises a friction driving member 300 keyed to shaft 29 by a set screw 301, said driving member 300 being housed within a drum head 302 of drive roll 28, and interposed loosely on shaft 29 adjacent each side of member 300 is a friction washer 303. One end of drum 302 is closed by an integral wall 304 and the other end is closed by a removable head 305 which is adjustably screwed into the drum and is locked therein by set screw 306. Reference numeral 307 indicates a grease plug for this connection. The head 305 is screwed into the drum with sufficient tightness to provide sufficient friction to properly drive the upper baling belt 80, through its drive roller, yet allow a slippage thereof instead of between the drive roller 28 and belt 80 which otherwise would occur due to the increasing diameter of the forming bale as it is rolled up. Thus wear of the belt is substantially eliminated as relates to slippage of said belt on its drive roller. It will be readily apparent that as the bale enlarges with the hay being fed in on the lower belt 81 on the drum roller 31 more of the belt is required about the bale and slippage would occur between the roll 28 and belt 80. The friction connection takes care of this slippage.

Below the upper-driver-roller 28 a large drum-roller 31 for driving the lower belt 81 is keyed to its shaft 32, the latter being carried in suitable bearings 33, which are secured to the lower part of the brackets or to the frame.

At one end of the drum-roller shaft 32 is keyed a sprocket wheel 34 carrying a sprocket chain 35, which is driven by a driver-sprocket 36 secured to the driver shaft 29. The upper tension-roller 38 for the upper belt 80 idles on its shaft 39 which is carried in suitable sockets or otherwise at the front end of oppositely disposed upper-tension-roller arms 40.

The arms 40 are swingably mounted on a rod 41 which is carried by bearings in brackets 42, the latter being secured to or forming a part of the side members or side portions of the frame 20.

The lower-tension-roller 43 for the lower belt 81 is idly mounted on its shaft 44 and is swingably carried by and journaled in and between oppositely disposed lower-tension-roller arms 45, which are pivotally attached to the frame as at 46. Tension pinion gears 44a are keyed to shaft 44 adjacent arms 45 and are in operable mesh with arcuate racks 44b.

The lower-tension-roller arms 45 have simultaneous and corresponding movements with respect to each other and simultaneous movements with respect to the upper-tension-roller arms 40, said movements being effected by means of connecting rods 47 which are pivotally mounted, as at 48, to the lower-tension-roller-arms 45, and to the upper arms 40, as at 49. An arm 51 is keyed to the end of rod 41, said rod being also keyed to the upper-tension-roller arm 40. A normally contracting spring 52 is secured to the outer end of the arm 51 and extends downwardly therefrom and connects with a spring-tension-adjusting bolt 53, the latter extending through an eye 54 provided upon any suitable place of the frame 20. A lower pressing roller 56 is idly mounted in anti-friction bearings on its shaft 57 which is keyed or otherwise rigidly secured at each end to and between oppositely disposed lower-trip-arms 58, which are pivotally connected, as at 60, to the oppositely disposed upper-trip-arms 61 and the latter are rigidly keyed or secured to a shaft 62, on which is idly mounted upper-trip-roller 63. The remaining construction and operation of the baling mechanism is substantially the same as that disclosed and claimed in my Patent No. 2,096,990, only such other parts of the machine covered by Patent No. 2,096,990 will be described as are necessary to fully disclose the construction and operation of the present invention, all of which is fully described herein.

On each end of the shaft 62 which extends through opposite arms 61, a flanged guide wheel 70 is rotatably mounted, said flanged wheels, during the growth of the bale, riding on the upper surfaces of oppositely disposed guide rails 71 which are secured at their ends to the side frame members of the frame 20. The guide rails 71 are of channel shape in cross-section and the horizontal lower guide flange is wider than the horizontal upper track flange. In these channels tilting bars 73 are located, said bars being designed for unlocking hooks 65 for discharging a formed bale by means of studs 69 projecting from hooks 64, and these bars have projections 74 near each end and said projections extend through apertures of the guide rails 71 and are each pivoted to adjacent ears 75 of the rails.

The forward ends of the tilting bars 73 are pivoted to the lower ends of reach rods 77 which are pivoted to levers 78, said levers 78 being rigidly secured upon and near the ends of a transverse rod 79. The rod 79 is rotatably supported by and between the side members of the frame 20 whereby only simultaneous movement of both tilting bars 73 are permitted. The levers 78 may be used for manual actuation and lifting of said tilting bars for causing the discharge of the bale, although automatic means for performing said operation is provided and both operations will be described hereinafter.

The upper-baling-belt 80 is driven by the upper drive roller 28 and passes over the upper tension roller 38 and the upper trip roller 63. The lower baling belt 81 passes over and is driven by the drum roller 31, over the lower trip roller 56, and the lower tension roller 43. The belts 80 and 81 are preferably formed of a single strip of flexible material of substantially the same width as the length of the rollers and each belt has a marginal, substantially V-shaped flange 80a and 81a respectively, adapted to be operably received in circumferential grooves 28a and 31a adjacent the respective ends of said rollers thereby maintaining the belts in proper alignment on said rollers and assuring more positive drive of the belts as will hereinafter be explained. The grooves 28a and 31a adjacent the ends of drive rollers 28 and 31 are small enough and tapered sufficiently so that the flanges of the belts 80 and 81 are somewhat wedged in their respective grooves thereby providing positive drive for the belts 80 and 81. Grooves as 56a in Fig. 23 of the respetcive idler rollers 38, 43, 56 and 63 are somewhat wider and shallower than those in rollers 38 and 31 and serve primarily as guides for said belts 80 and 81.

A feed roller 118 rides on belts 81 to press hay thereagainst and feed it between the belts. A shield 129 extends between the feed roller 118 and upper drive roller 28 to prevent the incoming hay from contacting the upper belts on roller 28 too soon and passing up between said roller 28 and the feeding roller 118.

Oppositely disposed hanger members 87 which are arcuately shaped are pivotally mounted at their lower ends on the lower trip roller shaft 57 adjacent to arm 58 and the upper ends of the hanger member 87 are pivotally attached as at 88 to the hanger levers 89, the latter being swingably positioned upon the rod 41.

To the opposite ends of levers 89 contracting springs 90 are connected, the lower ends of said springs being attached to the short arms 94b, of the oppositely positioned members 91 at 94c, the members 91 being rotatably carried on a rod 92 which is supported at each end by plates 93 which comprise a part of the frame 20. Each member 91 has spaced projecting arms, one long arm 94 and one short arm 94b, in substantially parallel alignment. Connectors 95 pivotally connect the ends of the respective long arms 94 at points 94a to the upper ends of the upper trip roller arms 61 as at 97. The connections are such as to limit the forward movement of roller 63 toward the drive roller 28, with a cushioning effect provided by the springs 90 at times when the trip rollers are returning to their initial position upon the discharge of a bale.

To each hanger member 87 is connected a looped link 98 encircling the rod 92, or preferably encircling and movable on a reduced portion of the hub of the element 91, connecting the long arm 94 and the short arm 94b thereof. The links 98 have the function of limiting the movement of the lower trip roller 56 associated with the lower end of the hanger members 87.

It will be noted that the members 91 as herein described are an improvement over the bell crank and two part connection construction in my Patent No. 2,096,990. It at once substitutes the simpler construction of one piece connectors for the two links and gives a better action of the springs in the return of the parts to their initial position upon the discharge of a bale, and at the initial position it gives a relatively greater pull on the roll 63 against the upper belt 80. It will be noted that the springs 90 are then pulling on short arms 94b of member 91 at approximately right angles whereat the maximum leverage is secured while the long arms 94 of members 91 are pulled down by connectors 95 until pivot points 94a are nearly on dead center giving the greatest pull at the proper time. It will be further seen that when the bale is formed the springs 90 have the least action and have less tension on arms 89 permitting a more prompt downward swing of the lower pressing roller 56 upon the discharge of the bale, while upon closing of the pressure rollers 56 and 63 the springs 90 have the greatest action on both.

A detachable feeding conveyor, Figures 1 and 2, is suspended from the front of the machine and is adapted to receive hay or other material to be baled, which may be placed on by hand or picked up from the ground as the machine is moved along as will be described and claimed in an application to be filed later. The feeding conveyor trough 310 is constructed of sheet metal and mounted in a suitable frame of angle, and T irons and bars. Within the conveyor is an endless traveling web of belt 311 which conveys the hay to the feed roller and baling belts. The upper end of the trough has head plates 312 which have sockets 313 at their extended ends that engage boxings 313a of drum roller shaft 32. A hook 314 pivoted as at 315 to the head plates also engage said boxing 313a and detachably locks the conveyor to the machine. Suspension rods 316 support the front end of the conveyor. The connecting mechanism of these rods 316 relate more to the feature for automatically picking up the hay from the ground and will be more fully described and claimed in a later application.

A shaft 337 carrying suitable sprockets 338 for driving the web is journaled in self-centering bearings 339 that are carried in holes in the head plates 312. One end of shaft 337 extends through one of the bearings. This bearing has a projecting arm 340 that swingably carries at its end an intermediate idler spur gear 341 that meshes with a drive gear 222 on shaft 32 and also with driven gear 343 detachably keyed on the end of shaft 337. Gears 341 and 343 are interchangeable, one being somewhat larger than the other so that the relative speed of the web 311 may be increased or decreased as may be found desirable. The intermediate gear 341 is swingable out of engagement with the driving gear 222 so as to stop the feeding of hay to the baling rollers, and it is pulled and held in mesh by an extension spring, one end of which is attached to arm 340 carrying gear 341 while the other end is attached to the head plate 312 at 345. The disengagement may be manually effected by means of a hand lever 346 that is attached to the end of a transverse rod 347 rotatably carried in holes in head plates 312 and is turned up at its opposite end to form a corresponding hand lever so that the feeding can be stopped or started from either side of the machine. On the side of the lever 346 is a stud 346a carrying a small anti-friction roller or the like that works in a cam shaped hole in a wing 349 of bearing 339 and so positioned that when the lever is swung forward the intermediate gear 341 is forced out of engagement with the driving gear. It will be seen from Fig. 3 that the conveyor trough diverges in width at the front end. This is to give it a greater area on which to place the hay or other material as well as to give the front end wider ground coverage when used for windrow pick up of hay.

During the baling operation of the machine same may be drawn by the tractor to which it is connected, ahead of the machine, and hay in windrows picked up by the hay pick-up and feeding mechanism which feeds the hay to the baling mechanism and the baling proceeds as the machine is drawn along. When the bale has been fully formed to the desired size the tractor is brought to a stop relative to its forward movement and the wrapping of the bale and discharge of same is effected while the machine is standing stationary.

Another method of using the machine is to have the machine standing stationary, preferably with the tractor at the rear and attached to the machine by means of the reversed members 23a at the rear, means for connecting the shaft 29b to the rear of the gear box being provided. The material to be baled is brought to the machine and deposited onto the web, the conveyor being raised sufficiently at the front end when the machine is thus used so that said end will not contact the ground.

In either case the functioning of the baling and wrapping mechanism is the same and the automatic wrapping operation occurs in the following sequence: As the bale reaches a predetermined size a twine tube drops the free end of the binding twine onto the material adjacent one end of the bale and the rollers carry it to the bale. The feeding web of the conveyor is automatically stopped as the twine starts to wrap about the bale as it is led across to the opposite end of the bale, relative to the end at which the wrapping is commenced. As the twine reaches the opposite end of the bale it is cut off and the bale is automatically discharged. Upon the return of the baling rollers to the initial position the conveyor web is started up automatically and the process is repeated. The above outlined operations are brought about by the hereinafter described mechanism.

I now refer particularly to Figures 8 to 14 inclusive. As the bale is being formed and increases in diameter the rear ends of tension roller arms 45 are raised. One of said arms 45 is provided with a forward extension 45a, the free end of which moves downwardly as the rear end of arm 45 rises, said extension 45a being operably connected with the tripping mechanism for starting the wrapping of the bale and is adapted to operate said tripping mechanism and is also adapted to stop the feed conveying web automatically.

The means for effecting the operable engagement of the wrapping mechanism comprises an adjustable member 210 which is slidably received in a band loop 211 of a backing member 212, said member 210 being adjustable according to the size of the bale. The lower end of member 212 is pivotally connected at 213 to the free end of extension 45a. An adjustment locking screw 214 is provided in the member 212 and the inner end of said screw 214 is adapted to enter one of the recesses 215 of the adjustable member 210, said recesses being longitudinally aligned and spaced relative to the length of member 210.

The member 210 is received in the slot or notch 216, Fig. 9, in angularly bent lower end portion 217 of trip bar 218 and a cross-bar or lug 219 is provided on the member 210 adjacent the upper end thereof, said lug 219 being adapted to engage the end portion 217 and pull same downwardly as the member 210 is moved downwardly by the movement of arm 45 and extension 45a. When in its normal position the free end of end portion 217 rests on horizontal member 220 of the frame and as link member 210 moves downwardly, the flange cam portion 221 of said link member engages said member 220 and forces the free end of end portion 217 out of engagement with the member 220 prior to drawing bar 218 downwardly. The upper end member 212 contacts end portion 217 and raises same to its normal position upon return of arm 45 to its normal lowered or initial position whereat the initial bale forming operation occurs. Bar 218 is retained in position by guides 223 and by other adjacent parts of the machine so that operative movements of said bar are free.

As bar 218 is drawn downwardly by member 219 bracket 224, riveted to bar 218, engages a pin 225 fixed in gear control lever 226, said lever 226 being pivotally secured at 227 to a member of frame 20, the opposite or free end 228 of lever 226 being curved upwardly and approximately concentric with shaft 32 of drum roller 31. An adjustment bolt 229, screwed into an arm of gear lever 340, Fig. 14, extends toward end 228 and contacts same so that as lever 226 is moved downwardly movement is imparted to gear lever 340 through bolt 229. Intermediate, driven gear 341, is rotatably mounted on said arm 340 adjacent the end thereof and said gear 341 is forced out of engagement with driving gear 222 on shaft 32, being frictionally retained thereon by disks 222a and adjusting nut 222b. Disengagement of gear 341 from gear 222 stops operation of the hay conveying web 311 so that no more hay is fed to the baling machine during the wrapping of said bale.

Simultaneously with the disengagement of the gear 341 a trip 233, pivoted on pin 234 on bar 218 and retained in operative position by gravity, due to the proper balancing thereof, engages a laterally extending portion 235 of trip rod 236 and further downward movement of bar 218 causes limited rotation of rod 236, said rod being rotatably mounted adjacent the lower end in portion 237 of bracket 24 and at the upper end to bracket 237a of the frame of the machine.

The trip 233, as same moves further downwardly, passes beyond the portion 235 and upon return movement of bar 218, said trip 233 is depressed as same passes said portion 235, returning to its normal position by gravity as above explained. An enlarged opening 238 in which is received a pin 239 fixed in bar 218 provides means for limiting the movement of trip 233 on its pivot 234. Return movement of bar 218 occurs after the bale has been discharged and lever 45 returns to its normal position for initial formation of a bale.

Referring now to Figures 15 to 19 inclusive the upper end of rod 236 is threaded and provided with nuts 236a on each side of bracket 237a and spaced apart a greater distance than the length of said bracket in which rod 236 is journaled in a sleeve 236b on rod 236 thus permitting a limited longitudinal movement of said rod 236 in bracket 237a. Adjacent the upper end of rod 236 is a seat piece 240 secured to said rod. An expansion spring 240a, suitably secured at one end to the bracket 237a and at the other end to a suitable stud 240b projecting from said rod 236 urges or oscillates said seat piece to normal position whereat same will engage block 241 of half-nut 242. Normally the block rests on the upper end of the seat piece 240 and the weight thereof expands spring 240a so that the weight rests on upper nut 236a on rod 236. After tripping of the half-nut the spring 240a draws the seat piece upwardly, limited by the lower nut 236a assuring that trip 233 will pass downwardly beyond laterally turned portion 235 of rod 236 thus permitting the seat piece to return to its normal position during the wrapping operation.

Normally block 241 is engaged by the upper end of seat piece 240, at which time the half-nut 242 is out of engagement with trapezoidally threaded screw 243. Screw 243 is rotatably mounted in brackets 244 secured to the frame of the machine and is provided with a bevel gear 245 which is meshed with a bevel gear 246 secured on the adjacent end of shaft 29 which drives screw 243. Nut 242 is slidably secured on nut guide 247 and an operating lever 248 is pivotally mounted to nut 242 between the back of said nut and the block 241, the pivot for said lever 248 being bolt 249 which also retains block 241 on said nut 242. Upon operative rotation of rod 236 seat piece 240 is moved out of engagement with half-nut 242 permitting said nut to drop downwardly on guide 247 by force of gravity aided by a spring hereinafter described. As said nut drops, twine feed tube 250, Figure 4, swings downwardly on its pivot bolt 251 so that the free end thereof is depending adjacent one end of the bale to be wrapped, a curved hook spring member 252 being provided to limit the swing of said tube 250, said hook member 252 being secured to a vertical strip 253 secured to the frame of the machine. Arms 254 and 255 are secured to the tube 250 adjacent its pivoted end and spring 256, operably secured to arm 255 through link 257, aids in moving tube 250 into the initial position for wrapping of the bale, arm 255 being operably connected with arm 248 by a connecting rod 258 connected at one end to the free end of lever 248 and at the other end to the free end of arm 255. Spring 256, which aids in moving tube 250 to the initial wrapping position also aids in moving half-nut 242 downwardly on its guide through the connection between the tube and arm or lever 248. Lever 248 is slidable through a fulcrum block 259 intermediate the ends thereof, said block 259 being slidable on bar 260 secured to the strip 253 and other members of the frame 20. Bar 260 is provided with a plurality of notches 261 spaced apart thereon. A rotatable key 262 is received in one of the notches 261 to lock said block in adjusted position but is provided with a notch 263 which permits disengagement of the key from the notches 261 when the notch 263 is turned to face the adjacent edge of bar 260 to permit the block to be moved to another adjustment position thereon. Key 262 is provided with a laterally turned portion 264 forming a handle for rotating said key 262 to lock or unlock the block 259.

Lever 248 is received between the block 259 and a retaining member 265 secured to the block by studs 266, carrying rollers 267 to space member 265 from block 259 to provide anti-friction slidable movement between the block assembly and the lever 248 as well as pivotal movement of the lever 248 relative to the block. Adjustment of the block 259 on bar 260 changes the pivotal axis of lever 248 thereby altering the spacing of the twine wrapped on the bale and the amount of twine wrapped on the bale. The rollers 267 are spaced to allow a certain amount of lost motion of the lever between them.

A roll of binder twine 268 is provided, supported in a basket 269 secured to the frame 20 and the twine is passed about a pulley 270 operably mounted in a bracket 271 of the frame of the machine, and said twine is also passed over pulley 272 operably fixed to the free end of arm 254. The twine passes through tube 250 and a portion of the free end of said twine depends therefrom. Upon tripping of the wrapping mechanism and the swinging down of the tube to the initial wrapping position, the depending end of the twine drops onto the end of the last mat of hay passing into the baling machine and is caught by the baling belt and is wound on the bale as the tube 250 is caused to swing back to its original position shown in Figure 4. It should be understood that the baling mechanism is continued in operation at all times. The tube 250 remains against the strap hook 252, due to the lost motion between lever 248 and the fulcrum block, until the upward movement of half nut 242 carries lever 248 into contact with the upper roller 267 in the fulcrum block 259. This allows extra turns of twine on the bale at the beginning of the wrapping thereof to better secure said twine on the bale.

Tube 250 is caused to return to said original position by engagement of half-nut 242 with screw 243, said engagement of the half-nut with said screw being effected by the following described mechanism.

The twine is received between tension plates 273 suitably secured to one end of curved lever 274, a spring 275 on bolt 276 providing suitable tension for said plates to permit the twine to be drawn between said plates 273 and simultaneously to cause raising of lever 274 on its pivot 277 as the twine begins to wrap about the bale.

Intermediate the pivot 277 and plates 273 an extension 278 of guide 247 is pivotally secured to said lever 274. Forward movement of lever 274 causes an upward pull on guide 247. An angular slot 279 adjacent the lower end of guide 247 receives pin 280 therein and effects movement of the half nut 242 toward and into mesh with the screw 243 as the guide 247 is raised, lever 274 causing corresponding movement of the upper end of guide 247.

Rotation of the screw 243 raises the engaged half nut 242 thus moving lever 248 which in turn causes the tube to return to its normal raised position and as said tube returns to said normal raised position the twine is caused to wrap the bale from one end to the other. As half nut 242 is raised by screw 243 the block 241 of the half nut 242 contacts the curved side surface of seat piece 240 and moves said seat piece to one side causing rotation of rod 236, which movement moves rod 281 to a position wherein laterally turned end 282 of said rod 281 is ahead of a knife 283 relative to the lateral movement of the twine as same is led across the machine, said knife being in a position to cut the twine when same contacts the cutting edge thereof.

Tension twine guide plates 285 are provided in substantial alignment with the lateral path of the twine so that as the twine approaches the plates, said twine is received between the flared ends of said plates, said flared ends forming a V-shaped opening that permits passing of knots. A spring 286 on bolt 287 provides suitable tension between said plates 285. The free end of the twine is normally held between the tension plates 285 during the interval between wrapping operations and is pulled therefrom by the sudden swing of the feed tube to the initial wrapping position.

When the half-nut 242 is raised above the seat piece 240, roller 288, operably secured to lug 289 fixed to said half nut 242, drops into a notch 290 of guide 247, said roller being adapted to roll on the adjacent edge of said guide 247. When the roller drops into the notch 290 the half nut moves out of engagement with the screw 243, said half nut being retained in its upper position by the seat piece 240 which it has passed. At the time the seat piece 240 is returned to its normal position by spring 240a, said time being when the half nut has passed slightly above said seat piece 240, the arm 281 rotates so that end portion 282 is moved from before the knife 283 permitting the twine to snap against the sharp edge of said knife 283 which cuts the twine, said twine moving downwardly at this time. The twine is directed by the tension plates 285 to contact the knife 283, the knife being placed at an inclination and at an angle relative to the twine to facilitate cutting of the downwardly moving twine. The tension of the twine being released, lever 274 drops to its normal position by reason of the weight thereof and the weight of the guide 247, the latter moves at a lateral angle so that the half nut 242 may move out of engagement with the screw 243 and may move downwardly out of engagement with the screw 243 when the trip mechanism is operated again to begin the wrapping of a subsequently formed bale.

As the half nut approaches its upper limit of movement an extension 295 of lug 289 engages the adjacent end of bale tripping lever 291 and raises same until the adjacent free end of lever 291 rotates out of the path of the extension 295 and aids the half nut to move laterally out of engagement with screw 243, permitted by notch 290, and drops to the seat piece 240, whereupon said free end of lever 291 drops onto lug 289 and contacts the adjacent side of extension 295 to hold the half nut out of engagement with screw 243.

Lever 291 is adjustably bolted to lever 78 on a shaft 79 which extends across the machine and is mounted in suitable frame members and is rotatable therein. Lever 78 is provided adjacent each end of shaft 79 and each lever 78 is connected with the rods 77 pivotally secured to the respective levers 78 adjacent the free ends thereof. The rods 77 are operably secured adjacent their lower ends to the tilting bars 73. Tilting of the bars 73 by operation of the lever 291 causes said bars 73 to contact the studs 69 on latch hooks 64, pivoted at 65 on arms 61, and thus lift the hooks 64 from latching relation with arms 58, thereby releasing the locked trip arms 58 and 61 which permit discharge of the bale from the machine.

Return of the mechanism to the initial baling position after the wrapped bale is discharged effects meshing of the gears driving the web of the conveyor thus automatically starting same, and the forming and wrapping of the next bale will proceed as hereinabove described.

Referring particularly to Figure 2 wherein a modified embodiment of the drive rollers and baling belts is illustrated, reference numeral 400 indicates the plain drive roller on which is secured a covering 401 of frictional material such as fabrics, leather, or rubber. A plurality of belts 402 is shown instead of a single wide belt. The frictional covering of the drive rollers provides a more positive drive for the belts needed particularly during the initial formation of a bale when the belts are relatively loose on said drive rollers.

It should be noted that the tractor may be connected to the rear of the machine by means of draw-bar 23a, the power shaft 29b being operably connected with the gears in the gear box 29a from the rear thereof. The forward end of trough 310 is maintained in a raised position and hay fed to the conveyor web 311 by hand or otherwise. The operation of the machine is otherwise the same as heretofore described.

Briefly the operation of the machine is as follows: Hay or the like is picked up by the conveyor belt 311, or fed thereto by hand, said hay being fed to the baling mechanism by the belt 311. As the bale is formed and increases in diameter arms 45 rise and extension 45a swings downwardly drawing member 210 down until flange 221 contacts the edge of angle piece 220 which disengages portion 217 and draws same downwardly. Bracket 224 engages pin 225 of lever 226 and causes disengagement of the gears driving the conveyor belt 311 thus halting the feeding of additional material to the baling mechanism. Simultaneously trip 233 engages portion 235 of rod 236 to trip the wrapping mechanism, as hereinabove described, tube 250 swinging to a depending position whereat the twine end depending therefrom is caught on the last incoming hay or on lower baling belt and wrapped about the formed bale. The half nut 242 being brought into mesh with screw 243, as hereinabove described, the tube is caused to swing back toward its normal raised position thus feeding the twine between the feed rollers from one end of the bale to the other. The twine is cut by knife 283 and the bale is discharged by the raising of bale discharge trip lever 291 by half nut 242, the bale then being automatically discharged. Arms 45 return to their initial position and swing the forward end of extension 45a upwardly. The end of backing member 212 adjacent the portion 217 of bar 218 contacts said portion 217 and raises the bar 218 to its initial position. The machine is then ready to begin the formation, wrapping, and discharge of another bale.

Curved end portion 228 of arm 226 is provided with a bracket 228a on its upper side to which is pivoted an arm 228b which normally rests against shaft 32 as shown in Figure 14. Upon movement of end portion 228 for disengagement of gear 341 with its driving gear 222 the free end of arm 228b swings beneath shaft 32, said movement being limited by point 228c which strikes the bracket 228a. It should be noted that the pivot 228d of arm 228b is off-set relative to the longitudinal center of arm 228b to effect more positive stopping of the swing of arm 228b. When bar 218 is returned to its normal position after discharge of a bale the free curved end of arm 228b comes into contact with shaft 32. The shaft 32 as shown in Figure 14 rotates clock-wise and the friction between said shaft and free end of arm 228b causes the arm to be moved to its initial position. After the arm 228b passes beyond shaft 32 spring 340b pulls arm 340 in a manner to effect re-engagement of gear 341 with gear 222. The delay in re-engagement of gear 314 with gear 222, effected by arm 223b, permits the complete discharge of the bale and return of the baling mechanism to its initial position before material is again fed to the baling mechanism preparatory to the formation, wrapping, and discharge of another bale.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment th reof.

I claim as my invention:

1. The combination of a rotary hay baling machine which forms cylindrical bales horizontally and including means for discharging formed bales and having a conveying feed mechanism for feeding material to the baling machine, with twine wrapping mechanism operated by the baling machine and comprising a twine feed tube pivoted adjacent one end so that the free end may swing in an arc longitudinally of the bale, the free end of said twine normally depending from said tube, a rotatably mounted, trapezoidally threaded screw operably connected with the baling mechanism, a guide adjacent the screw and substantially parallel therewith, a half nut slidably received on the guide and normally out of engagement with the screw, a lever connecting the half nut with the feed tube, a pivot block pivotally supporting said lever intermediate the ends thereof, means for adjusting said block longitudinally of the lever to vary the pivotal axis thereof, the guide being so mounted that lateral operative movement thereof in one direction will cause engagement of the half nut with the screw, yielding means normally retaining the guide in a position wherein the half nut is out of engagement with the screw, movement of the half nut in one direction being adapted to effect a downward swing of the free end of the feed tube to a position adjacent one end of the bale and movement in the other direction to effect a reverse swing of said free end, yielding means for urging the half nut in the direction to effect the downward swing of said free end, seat means for releasably retaining the half nut in a position whereat the feed tube is in its upper position, means for releasing the half nut when a bale has been formed thereby causing the free end of the feed tube to swing to a depending position whereat the twine will be drawn into the baling machine and wrapped about the bale, means for stopping the feeding conveyor when the twine begins to wrap about the bale, means associated with the twine adapted to operably move the guide and engage the half nut when the twine begins to wrap and effect return movement of the half nut on the guide, means for causing extra twine to be wrapped at each end of the bale about the bale, means adapted to effect disengagement of the half nut when same reaches the opposite limit of movement thereof, means for cutting the twine after same has been wrapped on the bale from one end to the other thereof and permitting the guide to return to the initial position, means operated by the half nut for tripping the bale discharge mechanism after the bale has been wrapped and the half nut has reached its upper limit of movement, and means for delaying restarting the feed conveyor for a limited time.

2. The combination of a rotary hay baling machine which forms cylindrical bales horizontally and including means for discharging formed bales and having a conveying feed mechanism for feeding material to the baling machine, with twine wrapping mechanism operated by the baling machine and comprising a twine feed tube pivoted adjacent one end so that the free end may swing in an arc longitudinally of the bale, the free end of said twine normally depending from said tube, a rotatably mounted, trapezoidally threaded screw operably connected with the baling mechanism, a guide adjacent the screw and substantially parallel therewith, a half nut slidably received on the guide and normally out of engagement with the screw, a lever connecting the half nut with the feed tube, a pivot block pivotally supporting said lever intermediate the ends thereof, means for adjusting said block longitudinally of the lever to vary the pivotal axis thereof, the guide being so mounted that lateral operative movement thereof in one direction will cause engagement of the half nut with the screw, yielding means normally retaining the guide in a position wherein the half nut is out of engagement with the screw, movement of the half nut in one direction being adapted to effect a downward swing of the free end of the feed tube to a position adjacent one end of the bale and movement in the other direction to effect a reverse swing of said free end, yielding means for urging the half nut in the direction to effect the downward swing of said free end, seat means for releasably retaining the half nut in a position whereat the feed tube is in its upper position, means for releasing the half nut when a bale has been formed thereby causing the free end of the feed tube to swing to a depending position whereat the twine will be drawn into the baling machine and wrapped about the bale, means for stopping the feeding conveyor when the twine begins to wrap about the bale, means associated with the twine adapted to operably move the guide and engage the half nut when the twine begins to wrap and effect return movement of the half nut on the guide, means for causing extra twine to be wrapped at each end of the bale about the bale, means adapted to effect disengagement of the half nut when same reaches the opposite limit of the movement thereof, means for cutting the twine after same has been wrapped on the bale from one end to the other thereof and permitting the guide to return to the initial position, and means operated by the half nut for tripping the bale discharge mechanism after the bale has been wrapped and the half nut has reached its upper limit of movement.

3. The combination of a rotary hay baling machine which forms cylindrical bales horizontally and including means for discharging formed bales and having a conveying feed mechanism for feeding material to the baling machine, with twine wrapping mechanism operated by the baling machine and comprising a twine feed tube pivoted adjacent one end so that the free end may swing in an arc longitudinally of the bale, the free end of said twine normally depending from said tube, a rotatably mounted, trapezoidally threaded screw operably connected with the baling mechanism, a guide adjacent the screw and substantially parallel therewith, a half nut slidably received on the guide and normally out of engagement with the screw, a lever connecting the half nut with the feed tube, a pivot block pivotally supporting said lever intermediate the ends thereof, means for adjusting said block longitudinally of the lever to vary the pivotal axis thereof, the guide being so mounted that lateral operative movement thereof in one direction will cause engagement of the half nut with the screw, yielding means normally retaining the guide in a position wherein the half nut is out of engagement with the screw, movement of the half nut in one direction being adapted to effect a downward swing of the free end of the feed tube to a position adjacent one end of the bale and movement in the other direction to effect a reverse swing of said free end, yielding means for urging the half nut in the direction to effect the downward swing of said free end, seat means for releasably retaining the half nut in a position whereat the feed tube is in its upper position, means for releasing the half nut when a bale has been formed thereby causing the free end of the feed tube to swing to a depending position whereat the twine will be drawn into the baling machine and wrapped about the bale, means for stopping the feeding conveyor when the twine begins to wrap about the bale, means associated with the twine adapted to operably move the guide and engage the half nut when the twine begins to wrap and effect return movement of the half nut on the guide about the bale, means adapted to effect disengagement of the half nut when same reaches the opposite limit of movement thereof, means for cutting the twine after same has been wrapped on the bale from one end to the other thereof and permitting the guide to return to the initial position, and means operated by the half nut for tripping the bale discharge mechanism after the bale has been wrapped and the half nut has reached its upper limit of movement.

4. The combination of a rotary hay baling machine which forms cylindrical bales horizontally and includes means for discharging formed bales, with twine wrapping means operated by the baling machine and comprising a twine feed tube pivoted adjacent one end so that the free end thereof may swing in an arc longitudinally of the bale, said free end normally being raised, twine received within the tube and adapted to feed therethrough, the free end of the twine normally depending from the free end of said tube, means for operably moving the feed tube and means for cutting the twine after the bale has been fully wrapped, a rotatably mounted screw operably connected with the baling mechanism, a half nut, a guide on which the half nut is slidably received, said guide being adapted to guide the half nut longitudinally of the screw, a lever operably connecting the half nut with the feed tube, said lever being pivotally mounted intermediate the ends thereof, means for moving the guide in a manner to engage the half nut with the screw, said half nut being normally retained out of engagement with said screw, movement of the half nut in one direction being adapted to effect a downward swing of the free end of the feed tube to a position adjacent one end of the bale where initial wrapping occurs and movement in the other direction adapted to effect a reverse swing of said free end, yielding means adapted to urge the half nut in the direction to effect the downward swing of said free end of the tube, seat means for releasably retaining the half nut in a position whereat the feed tube is in its raised position, means for disengaging the seat piece with the half nut when a bale has been formed thereby causing the free end of the feed tube to swing to a depending position, means adapted to operably move the guide and engage the half nut with the screw when said twine begins to wrap about the bale, means adapted to effect disengagement of the half nut when same is moved to its extreme limit of movement by the screw, means for frictionally pinching the twine adjacent the cutting means, means for cutting the twine after same has been wrapped on the bale from one end to the other thereof, means causing movement of the guide to its initial position, and means for tripping the bale discharge mechanism after the bale has been wrapped and the twine cut.

5. The combination of a rotary hay baling machine which forms cylindrical bales, with twine wrapping means operated by the baling machine and comprising a twine feed tube pivoted adjacent one end so that the free end thereof may swing in an arc longitudinally of the bale, twine received within the tube and adapted to feed therethrough, the free end of the twine normally depending from the free end of said tube, means automatically operative when the bale has reached a predetermined diameter for operably moving the feed tube, and means for cutting the twine after the bale has been wrapped from one end to the other.

6. The combination of a rotary hay baling machine which forms cylindrical bales, with twine wrapping means operated by the baling machine, said wrapping means including a twine feed tube pivoted adjacent one end so that the free end thereof may swing in an arc longitudinally of the bale, said free end normally being raised, twine received within the tube and adapted to feed therethrough, the free end of the twine normally depending from the free end of said tube, adjustable means for altering the spacing of the twine to be wrapped about the bale, means including a threaded rotatable member and a threaded nut movable by said threaded member for operably moving the feed tube, means for cutting the twine after the bale has been fully wrapped, and tension plates adapted to receive the free end portion of the twine and releasably hold same when the feed tube is in the raised position.

7. In twine wrapping mechanism for wrapping bales in a rotary hay baling machine, means adapted to feed twine from one end of the bale to the other while the bale is being rotated, means for operating said twine feeding means, said operating means including a trip, a rotatable rod having a laterally turned portion engageable by the trip, a seat piece on said rod adjacent the opposite end from the laterally turned portion, said rod being adapted to move longitudinally, means for limiting the longitudinal movement of the rod, a guide adjacent the rod and substantially parallel therewith, a half nut slidable on the guide and adapted to be engaged by the seat piece, yielding means adapted to urge said half nut along the guide in one direction and to urge the engaged seat piece and rod on which same is attached in said direction, a spring of less strength than said yielding means adapted to draw the rod in the opposite direction when the seat piece is disengaged from the half nut, said trip being adapted to engage the laterally turned portion of the rod and rotate same to disengage seat piece from the half nut, and pass beyond said laterally turned portion, longitudinal movement of the rod effected by the spring being adapted to insure the trip passing beyond the laterally turned portion of said rod.

8. The combination of a rotary hay baling machine which forms cylindrical bales and includes means for discharging formed bales and means for feeding material to the baling machine, with twine wrapping mechanism comprising twine feeding means adapted to move longitudinally of the bale to lead twine from one end of the bale to the other while the bale is being rotated in the baling machine, means automatically responsive when the bale has reached a predetermined diameter for operating the twine feed means to effect wrapping of the bale, means for stopping the means for feeding material to the baling means, means for cutting the twine after the bale has been wrapped therewith from one end to the other, means adapted to trip the bale discharge means to discharge the bale after the bale has been wrapped and the twine has been cut, and means for automatically starting the material feeding means after the twine-wrapped bale has been discharged.

9. The combination of a rotary hay baling machine which forms cylindrical bales and includes means for discharging formed bales, with twine wrapping means comprising twine feeding means movable longitudinally of the bale and adapted to feed twine from one end of the bale to the other while the bale is being rotated in the baling machine, means automatically responsive when the bale has reached a predetermined diameter for operating the twine to effect wrapping of the bale from one end to the other longitudinally thereof, means for cutting the twine after the bale has been wrapped, and means adapted to automatically trip the bale discharge means to discharge the bale after the twine has been cut.

10. The combination of a rotary hay baling machine which forms cylindrical bales, with twine wrapping means comprising a twine feed adapted to feed twine from one end of the bale to the other end while the bale is being rotated in the baling machine, and means automatically responsive when the bale has reached a predetermined diameter for operating the twine feed to effect wrapping of the bale from one end to the other longitudinally thereof, without displacement of the bale longitudinally of its axis.

11. The combination of a rotary hay baling machine which forms cylindrical bales and includes means for discharging formed bales, with twine wrapping means comprising a twine feed adapted to feed twine from one end of the bale to the other while the bale is being rotated in the baling machine, means automatically responsive when the bale has reached a predetermined diameter for operating the twine feed to effect wrapping of the bale from one end to the other longitudinally thereof, while the bale is maintained against movement parallel to its longitudinal axis and means for the cutting of twine after the bale has been wrapped.

12. In a baling machine including a baling mechanism adapted for rolling fibrous material into a cylindrical bale, a twine-wrapping mechanism for wrapping twine spirally about the bale from one end to the other as same revolves in the machine comprising twine feeding means including a member pivoted adjacent the upper end thereof and so positioned that the other end may freely swing downwardly longitudinally of the bale, a stop to limit the movement of said member to initial wrapping position adjacent one end of the bale, a trapezoidally threaded screw operatively connected with the baling mechanism, a guide-bar mounted adjacent to and parallel with said screw and adapted for lateral movement, a half-nut slidably mounted on said guide-bar and normally disengaged from said screw and operatively connected with the twine feeding means, a rod, a seat-piece projecting laterally from said rod and having a limited rotary movement and normally supporting said half-nut in its operatively disengaged upper position, bale-wrapping twine extending from the free end of said member, a tripping mechanism operable by the baling mechanism, the lower end of said rod having a lateral projection adapted to be operatively engaged by said tripping mechanism when the bale has reached a predetermined diameter to effect a side movement of the seat-piece whereby said half-nut is unseated permitting it and the twine feeding means to drop to initial wrapping positions, whereat the free end of the twine is entwined in the material being baled, twine tension means operatively associated with said guide-bar adapted to effect lateral movement of said guide-bar to thereby cause said half-nut to engage the screw responsively to a tensioning of the twine of said tension means as the twine begins to wrap about the bale whereupon said half-nut is engaged by the screw and said twine feeding member is gradually moved to its normal position of rest while leading the twine to the other end of the bale during the rotation of the bale, a spring urging said seat-piece to normal seating position; a knife spaced below the twine feeding means in the path of the twine adapted to sever the twine, and means to cause the disengagement of said half-nut from said screw.

13. In a machine for rolling fibrous material into cylindrical bales, a mechanism for wrapping a single course of binder spirally about the bale from one end to the other end thereof and including means providing for an extra initial winding of said binder consisting of a binder feeding tube pivoted adjacent one end thereof and normally retained in a position wherein the end of said binder depends from the free end of said tube, releasable means permitting said tube to swing to initial wrapping position adjacent one end of the bale, a stop to limit such swing, a spring urging said tube against said stop, baler-driven operating means, means to guide the binder into said tube providing initial slack in the binder, a lever having one end operatively connected with said tube and its other end connected with said baler-driven operating means, a fulcrum for supporting said lever means permitting said operating means to operate for a limited time while said tube remains at rest against said stop to thereby afford a certain amount of said binder to be wrapped about one end of the bale for the better securing of the initial end of the binder.

14. In a machine in which fibrous material is rolled into a cylindrical roll, a mechanism for wrapping a binder spirally about the roll including adjustable means for varying the amount of binder wrapped on the roll comprising movable guiding means for the binder, operating means driven by a roll forming mechanism of the machine, a lever having one end connected with said binder guiding means and controlling the movement of said binder guiding means, the other end of said lever being operatively connected to said operating means, a fulcrum supporting the lever in a medial portion slidably mounted on the machine, and means for adjustably locking the fulcrum at predetermined points.

15. In a machine for rolling material into cylindrical bales, means for automatically wrapping a binder spirally about the bale, when it has reached a predetermined diameter and while said bale is immovable in a direction parallel to its longitudinal axis, consisting of binder wrapping means normally inoperative during the formation of the bale, and means for automatically operating said binder wrapping means when the bale has reached the predetermined diameter.

16. In a machine for rolling fibrous material into cylindrical bales, a mechanism for wrapping a single course of binder spirally about the bale from one end to the other end thereof and including means providing for an extra initial winding of said binder consisting of a binder feeding member pivoted adjacent one end thereof and normally retained in a position wherein the end of said binder depends from the free end of said member, releasable means permitting said member to swing to initial wrapping position adjacent one end of the bale, a stop to limit such swing, a spring urging said member against said stop, baler-driven operating means, means to guide the binder to said member providing initial slack in the binder, a lever having one end operatively connected with said member and its other end connected with said baler-driven operating means, and a fulcrum for supporting said lever means permitting said operating means to operate for a limited time while said member remains at rest against said stop to thereby afford a certain amount of said binder to be wrapped about one end of the bale for the better securing of the initial end of the binder.

17. In a baling machine including a baling mechanism adapted for rolling fibrous material into a cylindrical bale, a twine-wrapping mechanism for wrapping twine spirally about the bale from one end to the other as same revolves in the machine comprising twine feeding and guiding means including a member pivoted adjacent the upper end thereof and so positioned that the other end may freely swing downwardly longitudinally of the bale, mechanism for operating said pivoted member operatively connected with said baling mechanism, bale-wrapping twine extending from the free end of said pivoted member, a tripping mechanism operable by said baling mechanism, said pivoted member operating mechanism including means adapted to be operatively engaged by said tripping mechanism when the bale has reached a predetermined diameter whereby said twine-feeding means is permitted to move to initial wrapping position, whereat the free end of the twine is entwined in the material being baled, means for tensioning the twine operatively associated with said pivoted member operating mechanism adapted to cause said twine-guiding pivoted member to be gradually moved to its normal position of rest while leading the twine to the other end of the bale during the rotation of the bale, twine-cutting means disposed in the path of the twine adapted to sever the twine, and means for automatically rendering said pivoted member operating mechanism inoperative upon completion of a bale-wrapping operation.

18. In a baling machine including a baling mechanism for rolling fibrous material into a formed cylindrical bale, means for operating said baling mechanism, and mechanism operative automatically in response to the attainment of a predetermined diameter of the formed bale to effect spiral wrapping of a binding material about said bale from one end to the other thereof while the bale is in normal formed position in the machine, means automatically rendered operative to effect cutting of said wrapping material at the end of said wrapping operation, and means automatically rendered operative subsequent to the cutting of said wrapping material to effect the ejection of said formed and wrapped bale from said machine in a direction transverse to the longitudinal axis of the bale.

19. In a baling machine including a baling mechanism for rolling fibrous material into a formed cylindrical bale, means for operating said baling mechanism, and mechanism operative automatically in response to the attainment of a predetermined diameter of the formed bale to effect spiral wrapping of a binding material about said bale from one end to the other thereof while the bale is in normal formed position in the machine, and means rendered operative subsequent to completion of said wrapping operation to effect the ejection of said formed and wrapped bale from the machine in a direction transverse to the longitudinal axis of the bale.

20. In a baling machine for rolling fibrous material into a formed cylindrical bale, mechanism for wrapping a single course of binder spirally about the bale from one end to the other end thereof while the bale is in normal formed position in the machine including a pivotally mounted binder-guiding member normally retained in a position wherein a portion of the end of said binder depends from one end of said member, releasable means permitting said member to swing downwardly about its pivot into initial wrapping position to present said depending portion of the binder adjacent one end of the bale, a stop to limit such swing of said member, means urging said member against said stop, baler-driven operating means, means for guiding the binder to said member and providing initial slack in the binder, mechanism driven by said baler-driven operating means for progressively raising said member during the bale-wrapping operation, means operatively associated with said member-raising-mechanism for providing a limited lost motion period between elements of said member-raising-mechanism whereby said member-raising-mechanism is operative during such period, while said member remains at rest against said stop, to permit said depending portion of said binder to be wrapped about one end of the bale to better secure the initial binding end of the binder.

21. In a baling machine including a baling mechanism for rolling fibrous material into a formed cylindrical bale, means for operating said baling mechanism, and mechanism operative automatically in response to the attainment of a predetermined diameter of the formed bale to arrest the feeding of the material to said baling mechanism and to effect spiral wrapping of a binding material about said bale from one end to the other thereof while the bale is in normal formed position in the machine, means automatically rendered operative to effect cutting of said wrapping material, and automatically operable means for ejecting said formed and wrapped bale from said machine in a direction transverse to the longitudinal axis of the bale.

UMMO F. LUEBBEN.